3,230,459
HIGH SPEED OVERLOAD PROTECTION CIRCUIT
Francis A. Loya, Glen Burnie, Md., assignor, by mesne assignments, to the United States of America as represented by the Secretary of the Navy
Filed July 5, 1963, Ser. No. 293,209
1 Claim. (Cl. 328—8)

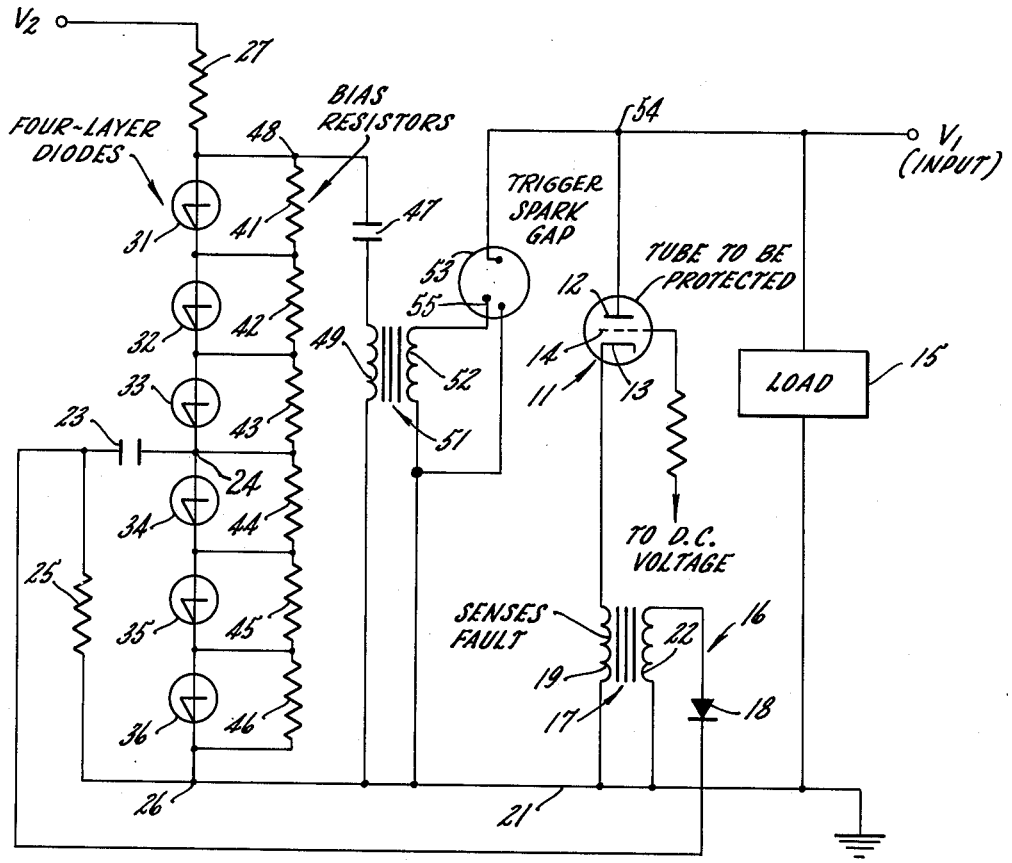

The present invention relates to an overload protection circuit, and more particularly to a circuit for protecting vacuum tubes operating with high anode voltages.

Vacuum tubes operating with high anode voltages are highly susceptible to unpredictable flash arcs which may cause permanent damage to the tubes unless protective measures are taken. One commonly-known protection method used to divert excess fault energy away from a tube comprises providing a low impedance shunt path. This shunt path is usually in the form of thyratrons and ignitrons fired by a fault signal which has been amplified to the high voltages required to ionize thyratrons and ignitrons. This amplification is usually accomplished by a vacuum tube voltage amplifier circuit.

One device used as a fast acting protective circuit is an electronic crowbar circuit that can operate within a few microseconds from the time of the application of a fault signal. One known device employs a solid state component, such as a silicon controlled rectifier (SCR) that is used as a short circuiter or fault displacer. Since the SCR will switch on in a few microseconds, it can be used to protect many sensitive circuits because it can function before current surges or high-energy voltage swings reach peak values.

However, in some high voltage vacuum tube circuits, it is necessary to divert the fault energy in shorter periods of time than is possible using heretofore known devices. One circumstance that requires extremely fast action is where a tube is capable of withstanding only a small percentage of the total stored energy and where additional components in series with the load for current limiting or sensing purposes cannot be tolerated. In such applications the rate of increase of the fault energy in the faulted tube is very rapid and a tube can be destroyed in a very short time.

The protection circuit of the present invention is capable of shunting fault energy in less than one-half microsecond from the initiation of a fault. A primary winding of a transformer is provided to sense a fault current and a voltage is developed in the secondary winding. This voltage is applied to a series string of four-layer switching diodes and causes the switching voltage of these diodes to be exceeded. This causes the series string of diodes to break down in its forward direction and offers a low impedance path for a charged capacitor. This capacitor discharges through the primary of a pulse transformer and a high voltage induced into the secondary winding causes the breakdown of a gap in a trigger spark gap. Following this breakdown, the trigger spark gap ionizes and offers a low impedance shunt path for the fault energy.

It is therefore a general object of the present invention to provide an improved overload protection circuit for a vacuum tube circuit.

Another object of the present invention is to provide an improved protection circuit that is very fast acting.

Other objects and advantages of the present invention will be readily appreciated as the same becomes better understood by reference to the following detailed description when considered in connection with the accompanying drawing which is a schematic circuit diagram of a protective system according to this invention.

Referring now to the drawing, which shows a preferred embodiment of the present invention, number 11 designates a tube that is to be protected from excessive fault energy. The tube might be of many different forms with, for purposes of illustration, a triode being shown having an anode 12, cathode 13, and a grid 14. Tube 11 and load 15, which might be a high energy load, are connected to a source of high voltage ($V_1$).

A fault sensing circuit 16 is provided comprised of a transformer 17 and a diode 18. The primary winding 19 of transformer 17 has one end connected to cathode 13 and the other end connected to lead 21. When a fault is sensed by the primary winding 19, a voltage is developed in the secondary winding 22 which has one end connected to lead 21 and the other end connected through diode 18 and capacitor 23 to junction point 24.

A string of four-layer diodes are connected in series between a second source of voltage ($V_2$) and lead 21. For purposes of illustration, six four-layer diodes are shown, these being designated by numerals 31 through 36 and each is provided with a bias resistor, which are designated by numerals 41 through 46. The four-layer diode is a two-terminal device which can exist in either of two states—an "open" or low conductance state corresponding to 10 to 100 megohms and a "closed" or high conductance state corresponding to 3 to 30 ohms. The diode is switched from one state to the other by controlling the voltage and current through it. If the voltage exceeds the breakdown voltage ($V_b$), the device will change from open to closed, provided sufficient current, designated as holding current ($I_h$), is available to hold it in the closed state. When the current falls below $I_h$, switching from "closed" back to "open" occurs.

A capacitor 47 has one end connected to junction point 48, which has one end of resistor 41 and one end of diode 31 connected thereto, and the other end of capacitor 47 is connected to one end of primary winding 49 of a pulse transformer 51. The secondary winding 52 of pulse transformer 51 has one end connected to lead 21 and the other end connected to the trigger electrode 55 of a trigger spark gap 53. One main electrode of the trigger spark gap is connected to junction point 54, which is common to anode 12, and the other main electrode is connected to lead 21.

In operation, assuming that a fault occurs in tube 11, the initial fault current is sensed by the primary winding 19 of transformer 17 which develops a voltage in secondary winding 22. This voltage is applied to the series string of four-layer diodes 31–36, and causes the diodes to switch to a closed position, that is, a high conductance state and offers a low impedance path for the charged capacitor 47. Capacitor 47 then discharges through the primary winding 49 of transformer 51, and a high voltage is induced into the secondary winding 52 of transformer 51. This high voltage causes a breakdown of trigger gap 53 which then ionizes and offers a low impedance shunt path for the fault energy. The four-layer diodes 31–36 are turned off by making use of the inductive kickback of the voltage across the primary winding 49 of transformer 51. When the four-layer diodes revert to their nonconducting state, capacitor 47 charges to the supply voltage and the circuit is reset for the next fault signal.

During operation, the four-layer switching diodes 31–36 are biased to a voltage slightly less than the switching voltage. This is accomplished by the bias circuit consisting of resistors 41–46. By way of example, if the four-layer diodes require 200 volts to switch, the bias voltage across each diode may be set to approximately 170 volts and then a fault signal voltage of 30 volts from the fault sensing circuit 16 will be required to break down the diodes. The response time of the circuit is controlled by resistor 27 and capacitor 47.

Obviously many modifications and variations of the present invention are possible in the light of the above teachings. For example, a lesser or greater number of four-layer diodes may be used without departing from the scope of the invention. It is therefore to be understood that the invention may be practiced otherwise than as specifically described.

What is claimed is:

A high speed overload protection circuit for a vacuum tube having at least an anode and a cathode comprising;

fault sensing means comprising a first transformer having primary and secondary windings, said primary winding being connected in series with said cathode, switching means including a plurality of four-layer diodes in series connected through a diode to said secondary winding, energy diverting means comprising a trigger spark gap having a pair of main electrodes and a trigger electrode, said pair of main electrodes connected in parallel with said vacuum tube, and a second transformer having a primary and a secondary winding, said primary winding of said second transformer being connected across said four-layer diodes and said secondary winding of said second transformer being connected between said trigger electrode and one said main electrodes of said trigger spark gap.

References Cited by the Examiner
UNITED STATES PATENTS

| | | | |
|---|---|---|---|
| 2,571,027 | 10/1951 | Garner | 315—91 |
| 2,928,026 | 3/1960 | Hoover | 315—125 |

FOREIGN PATENTS

| | | |
|---|---|---|
| 582,047 | 8/1959 | Canada. |

OTHER REFERENCES

I.B.M. Technical Disclosure Bulletin, P. Essinger, vol. 2, No. 4, Dec. 1959, page 96.

Shockley 4-Layer Diode Circuit Applications, Introduction to Shockley 4-Layer Diode, Shockley Transistor Unit of Clevite Transistor, March 1961, printed in U.S.A.

Solid/State/Design Application Note, July 1962, pages 53–55, Four-Layer Diode Pulse Modulators, Shockley Transistor Unit of Clevite Transistor, Palo Alto, California.

JOHN W. HUCKERT, *Primary Examiner.*

A. M. LESNIAK, *Assistant Examiner.*